(12) United States Patent
Reszewicz et al.

(10) Patent No.: US 12,173,755 B2
(45) Date of Patent: Dec. 24, 2024

(54) COMPLIANT JOINT DRIVE ASSEMBLY

(71) Applicant: Goodrich Corporation, Charlotte, NC (US)

(72) Inventors: Modest Reszewicz, Kuraszków (PL); Łukasz Turek, Wrocław (PL); Piotr Zając, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/178,890

(22) Filed: Mar. 6, 2023

(65) Prior Publication Data

US 2023/0287939 A1    Sep. 14, 2023

(30) Foreign Application Priority Data

Mar. 11, 2022    (EP) ..................... 22461523

(51) Int. Cl.
| | |
|---|---|
| *F16D 1/10* | (2006.01) |
| *F16D 3/68* | (2006.01) |
| *F16D 9/06* | (2006.01) |
| *F16K 5/06* | (2006.01) |
| *F16K 31/04* | (2006.01) |

(52) U.S. Cl.
CPC .............. *F16D 1/101* (2013.01); *F16D 3/68* (2013.01); *F16D 9/06* (2013.01); *F16K 5/0647* (2013.01); *F16K 31/041* (2013.01); *F16K 31/047* (2013.01); *F16D 2001/103* (2013.01); *F16D 2200/0021* (2013.01)

(58) Field of Classification Search
CPC ... F16D 1/101; F16D 3/68; F16D 9/06; F16D 2001/103; F16D 2200/0021; F16K 5/0647; F16K 31/041; F16K 31/047
See application file for complete search history.

(56) References Cited

U.S. PATENT DOCUMENTS

| | | | |
|---|---|---|---|
| 2,943,464 | A | 7/1960 | Voges |
| 4,034,575 | A | 7/1977 | Barth |
| 4,357,137 | A * | 11/1982 | Brown ..................... F16D 1/101 |
| | | | 464/159 |
| 8,172,198 | B2 | 5/2012 | Dorsey et al. |
| 11,027,400 | B2 | 6/2021 | Raskin et al. |
| 2008/0041476 | A1 | 2/2008 | Campany et al. |
| 2013/0341069 | A1 | 12/2013 | Demaretz |

(Continued)

FOREIGN PATENT DOCUMENTS

| | | |
|---|---|---|
| WO | 02059515 A1 | 8/2002 |
| WO | 2015036946 A1 | 3/2015 |
| WO | WO-2020005805 A1 * | 1/2020 ............. B25B 13/06 |

OTHER PUBLICATIONS

European Search Report for Application No. 22461523.7, mailed Sep. 1, 2022, 7 pages.

*Primary Examiner* — John Bastianelli
(74) *Attorney, Agent, or Firm* — CANTOR COLBURN LLP

(57) ABSTRACT

A torque transfer assembly includes a drive shaft and a driven shaft. The drive shaft includes a motor shaft configured to be connected to and rotated by a motor, and a cam shaft connected to and rotatable with the motor shaft. The driven shaft is connected to and rotatable with the cam shaft, and the cam shaft is formed of a dielectric material defining an insulating barrier between the drive and the driven shaft.

9 Claims, 3 Drawing Sheets

(56) References Cited

U.S. PATENT DOCUMENTS

| | | |
|---|---|---|
| 2019/0232470 A1 | 8/2019 | Xu |
| 2020/0262032 A1 | 8/2020 | Heitkamp |
| 2020/0376635 A1* | 12/2020 | Raskin .................. H01B 17/56 |
| 2021/0205962 A1 | 7/2021 | Mesnil et al. |

* cited by examiner

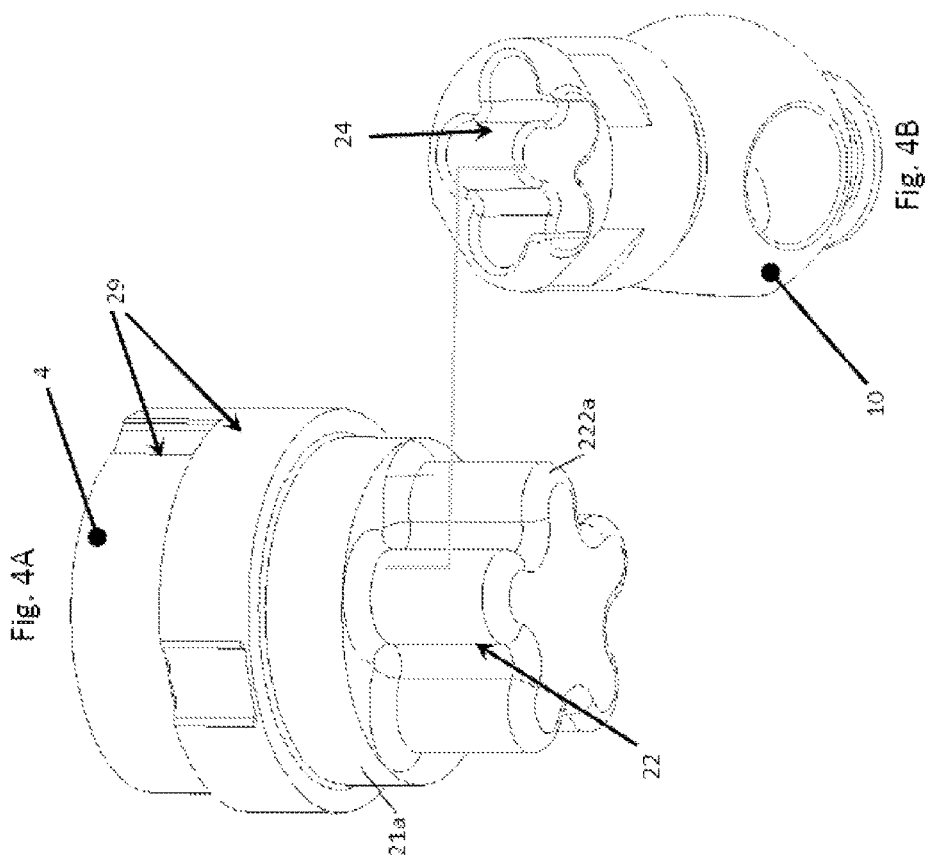
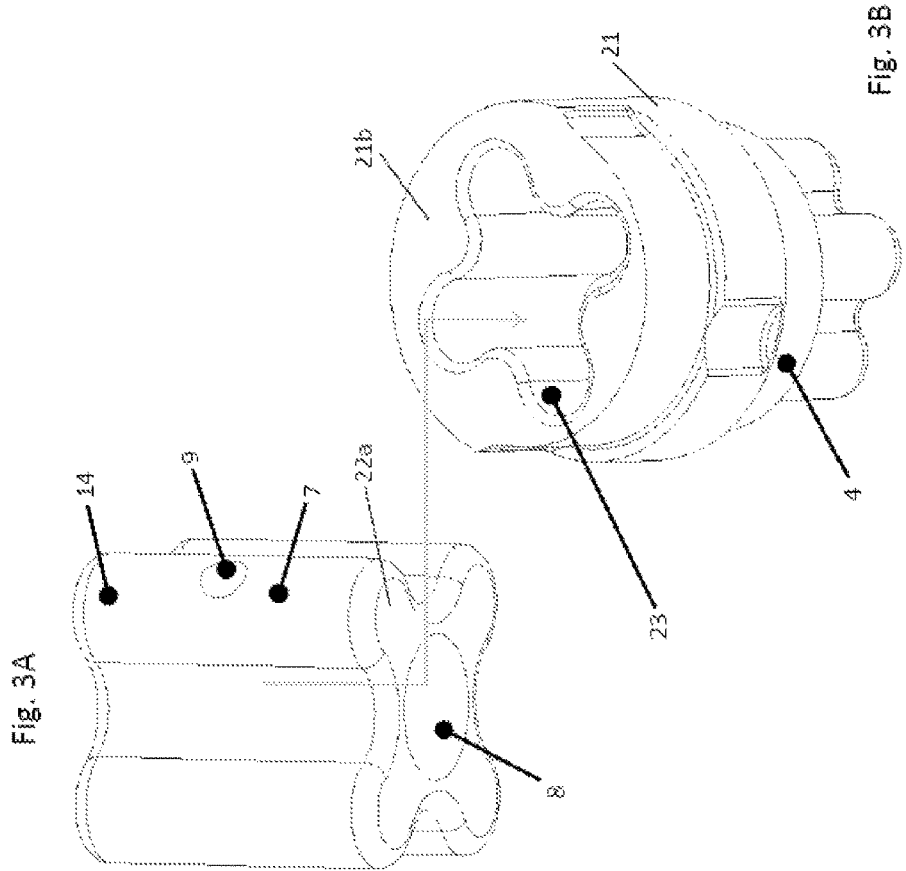

COMPLIANT JOINT DRIVE ASSEMBLY

CROSS-REFERENCE TO RELATED APPLICATIONS

This application claims priority to European Patent Application No. 22461523.7 filed Mar. 11, 2022, the entire contents of which is incorporated herein by reference.

TECHNICAL FIELD

The present disclosure relates to a compliant joint drive assembly whereby torque is transmitted from one end of the assembly to the other, the two ends joined by a compliant joint. An example of such an assembly is a ball valve assembly and, in particular, an assembly for a motorised ball valve.

BACKGROUND

Drive assemblies are used in many applications where a driving force is provided by an actuator such as a manual lever or a motor and the torque from the actuator is transmitted to a movable part along a drive line. For example, a valve may include a valve closure that is rotated by an actuator, either manually by means of a lever or handle or by means of a motor. The drive force from the motor is transmitted to the valve closure along a shaft arrangement, the shaft configured to transfer torque from the actuator to the valve closure. Particularly where the actuator is an electric motor, there is often a need to provide dielectric separation between the electrics and the moveable part especially if the movable part is in e.g. a wet environment, to avoid damage to the 'dry' motor end. On the other hand, it is necessary to maintain torque transmission along the entire drive line.

Ball valves are valves for controlling flow of a fluid e.g. water. The valve includes a ball shaft having a hole therethrough. The ball shaft is rotatable relative to the fluid flow channel such that when the hole is aligned with the channel, the valve allows fluid flow. To stop flow, the ball shaft is rotated so that the hole is not aligned with the flow. Ball valves can be operated manually e.g. by means of a handle for rotating the ball. Actuated ball valves are operated by a motor, which rotates the ball shaft between the open and closed positions. Ball valves find use in e.g. sanitation or water systems. One application of a valve moved by an electric motor is in an aircraft water supply system. Aircraft commonly have a water supply system for providing potable water to various outlets e.g. to sinks or wash basins, coffee machines, toilets, etc. One or more valve assemblies is provided in the system for the various outlets and at least some of these are driven by an electric motor so that they can be operated remotely or automatically. Such a system is described e.g. in U.S. Pat. No. 8,172,198. The use of actuated ball valves is, however, not limited to aircraft water systems and there are many other fields of application for such systems.

Actuated ball valves comprise the motor and drive part, also known as the 'dry' part, and the ball shaft part, which comes into contact with the water, also known as the 'wet' part. Seals need to be provided between the wet part and the dry part to avoid damage to the assembly by water getting to the electric motor during operation.

In aircraft systems and in other water systems, the valve ball shaft often has to be made of metal to satisfy durability and safety standards. Problems may occur with the valve if a fault in the electric motor transmits to the ball shaft due to the conductive path between the various metal parts.

The inventors have identified a need for a dielectric barrier to be provided between the two ends of a drive train e.g. between the ball shaft and the electric drive part of a ball valve assembly. The design should be capable of transmitting torque from the actuator end of the drive to the moveable part even in the event that the moveable part experiences some resistance e.g. becomes jammed or frozen such that a short torque peak is experienced.

SUMMARY

According to the disclosure, there is provided a torque transfer assembly comprising a drive shaft and a driven shaft, the drive shaft comprising a motor shaft configured to be connected to and rotated by a motor, and a cam shaft connected to and rotatable with the motor shaft, the driven shaft being connected to and rotatable with the cam shaft, and wherein the cam shaft is formed of a dielectric material defining an insulating barrier between the drive and the driven shaft.

In the example of a ball valve, the drive shaft is a ball shaft.

The cam shaft preferably has a plug and socket design to interface with the driven and the drive shaft.

A bushing may be provided between the cam shaft and the drive shaft.

In one example, the interface between the cam shaft and the bushing and the interface between the cam shaft and the driven shaft define multiple points of contact e.g. by being in the forms of multiple lobes.

A shear pin may be provided through aligned bores in the bushing and the motor shaft to rotatable connect these components and transfer torque.

In an example, all parts of the drive path are made of steel except the cam shaft.

The assembly may be a ball shaft assembly comprising a ball shaft as the driven shaft. A motor may be arranged to drive the ball shaft via the motor shaft and the cam shaft, as the drive shaft, the cam shaft being located between, and in torque transfer engagement with, the ball shaft and the motor shaft.

The ball shaft may be part of a water supply system e.g. an aircraft water supply system.

Preferred embodiments will now be described by way of example only, with reference to the drawings.

BRIEF DESCRIPTION OF THE DRAWINGS

FIG. 3A shows a perspective view of a bushing for use in the assembly of the disclosure.

FIG. 3B a cam shaft in one example of an assembly of the disclosure.

FIG. 4A shows an alternative perspective view of the cam shaft of FIG. 3B for use in the assembly of the disclosure.

FIG. 4B shows a ball shaft in one example of an assembly of the disclosure.

DETAILED DESCRIPTION

Figure 1:
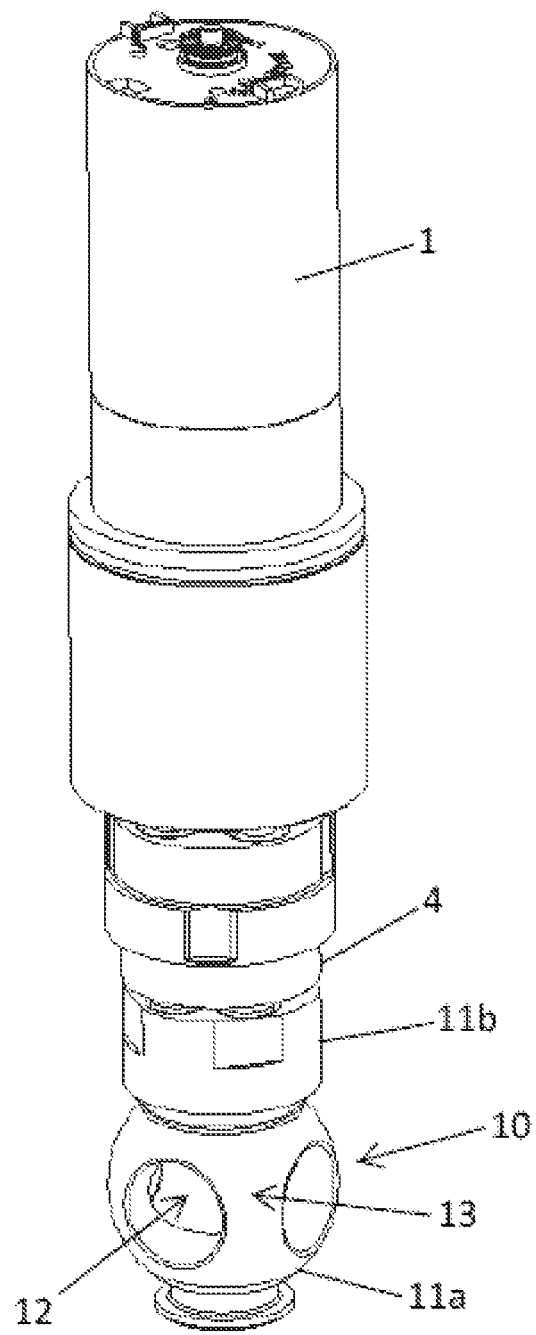
FIG. 1 is a perspective view of a motor driven ball valve assembly that can comprise a dielectric cam shaft according to this disclosure.

FIG. 1 is a perspective view of a motorised ball valve assembly including a dielectric cam shaft according to the present disclosure.

The operational part of the valve comprises a ball shaft 10 having a head part 11*a* defining a hole 12 therethrough defining a flow passage, and a shaft part 11*b* extending from the head for engagement with a drive part of the assembly. In use, the valve is arranged in a water or fluid pipe system such that in a first rotational position of the ball shaft 10, the hole is aligned with a fluid pipe to form a flow passage from the pipe and through the hole 12. To switch off the flow, the ball shaft is rotated e.g. by one quarter turn, so that the hole is no longer aligned with the pipe and, instead, flow from the pipe is blocked by the body 13 of the ball shaft. Valves with several positions and several input/output ports are known.

Figure 2:
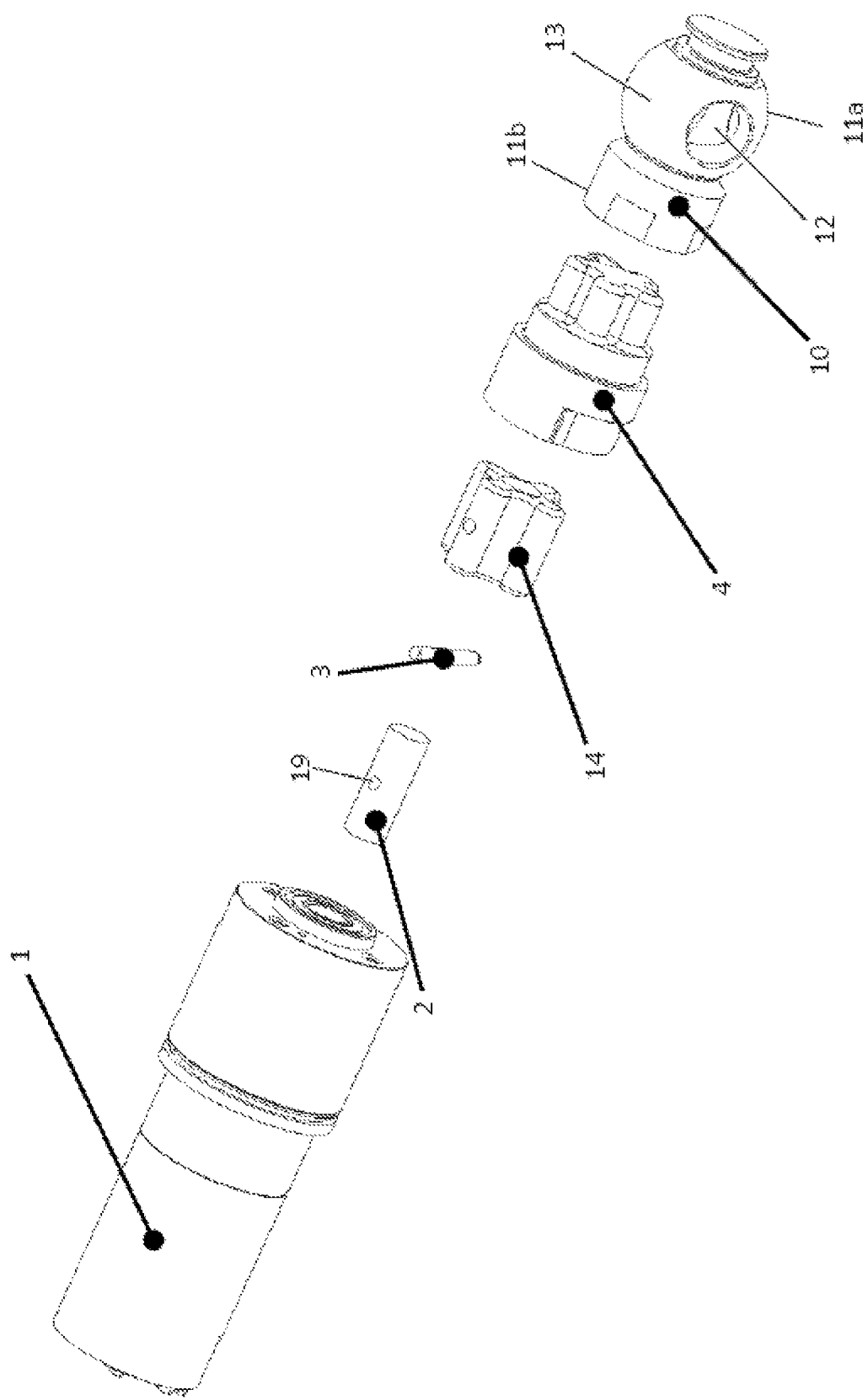
FIG. 2 is an exploded view of the assembly of FIG. 1 according to one example.

In a motorised ball valve, the ball shaft is rotated by means of an electric motor 1. The electric motor 1 drives a cam shaft 4 which engages with the ball shaft 10. In the example shown (see FIG. 2) the cam shaft 4 is connected to a motor shaft 2 extending from and rotated by the motor 1 via a bushing 14 as will be described further below. Rotation of the motor 1 causes rotation of the motor shaft 2 which, in turn, rotates the bushing 14 and, hence, the cam shaft 4 which rotates the ball shaft 10. Seals e.g. O-rings (not shown) may be provided where required in the drive train, to prevent water passing into the electric part of the assembly. The cam shaft may be provided with a profile 29 to interface with indicators such as microswitches (not shown), or other forms of sensors or indicators, to provide an indication of the angular position of the shaft. These components are standard for a motorised ball valve such as described in U.S. Pat. No. 8,172,198.

In the event that the motor fails, there is not only the risk of an electrical fault being transmitted to the wet end of the assembly, but there is also the problem that a motor failure will mean that the ball shaft cannot be rotated. In the event of failure of the motor, it may be necessary to change the position of the ball shaft to switch flow on or off. To address this, a manual handle (not shown) may be provided so that manual operation of the handle can rotate the ball shaft 10. The handle can be fitted to the assembly such that there is a form fitting or frictional engagement between them. Alternatively, a fixing element e.g. a locking pin (not shown) may be provided to secure the handle to the assembly.

As mentioned above, to provide the required strength and to satisfy other standards such as safety, durability and hygiene standards, the various shafts will often be made of metal e.g. steel. If there is a problem with the electrics at the motor end of the assembly, this would be transmitted directly to the ball shaft and can cause problems such as electric shocks or arcing. To avoid this problem, the assembly of the present disclosure forms the cam shaft 4 of a dielectric material to provide insulation between the ball shaft 10 (or, more generally, driven end) and the electric motor 1 (or, more generally, drive end).

In a conventional assembly where the cam shaft is also made of metal, it can be attached directly to the motor shaft e.g. by keyed connection or some other securing arrangement, including a double shear pin. Metals such as steel are strong enough to handle a concentrated load without damage to the parts. In this invention, however, the cam shaft 4 is made of a dielectric material. Such materials are prone to damage if subjected to a load in a concentrated area e.g. due to the interface with the motor shaft/shearing of the shear pin. For this reason, the dielectric cam shaft of the invention is connected to the motor shaft 2 via a bushing that interfaces with the cam shaft in such a manner as to distribute the load on the cam shaft from the motor shaft. In order to ensure this load distribution, the interface between the cam shaft and the motor shaft is formed by forming a blind bore in the cam shaft body configured to receive a bushing that, in turn, is configured to receive the motor shaft 2. The bushing between the motor shaft and the cam shaft distributes the load acting on the cam shaft from the motor and the motor shaft. The effect of shearing would also be distributed across the interface, thus avoiding damage to the dielectric cam shaft.

The dielectric cam shaft is structured to have dielectric properties and is shaped to provide torque transmission from the electric motor 1 to the ball shaft 10. The shape of the cam shaft, or, more specifically, the interface between the cam shaft and the motor shaft and between the cam shaft and the ball shaft should be such as to be able to withstand a short torque peak if the ball shaft end is fixed or blocked. To achieve the torque transfer property and to ensure the above mentioned load distribution necessary to avoid damage to the dielectric cam shaft 4, the interfaces are shaped to define lobes or ribs, to engage with corresponding engagement features provided at the ball shaft and the bushing as described further below. The important thing is that the interfaces of the cam shaft have a shape that can engage with the shafts between which it is located in a manner that torque applied to one of the shafts is transferred to the other shaft via the dielectric cam shaft.

In an example, particularly for use in wet or harsh environments, all of the components required for torque transfer are made of steel, particularly stainless steel expect for the dielectric cam shaft 4 which functions as a dielectric barrier between the steel parts.

Whilst the cam shaft interfaces may have different shapes, as described below, ideally, to ensure reliable torque transmission, the shapes should be such as to define multiple points of engagement, as such a structure has been found to transfer the required torque optimally. The bushing pushes the cam shaft as the motor shaft rotates, and the cam shaft pushes the ball shaft. Multiple forces act on distances to the centre of moment. In all examples, the interfaces should form a tight fit to reduce the effects of backlash and to ensure coaxiality. The cam shaft can be e.g. machined to shape from tubing or can be moulded to shape.

As shown in the drawings, the cam shaft 4 is formed as a plug-and-socket component of dielectric material that is arranged to be fitted between the motor shaft 2, via the bushing 14, and the ball shaft 10, to act as a cam shaft in the drive shaft as well as to form a dielectric barrier. The cam shaft 4 comprises a body 21 having, in the examples, an essentially circular cross-section such that the periphery of the body 21 essentially aligns axially with the outer shape of the ball shaft such that, when assembled, the cam shaft and the shaft part of the ball shaft define an essentially cylindrical assembly (see e.g. FIG. 1). The body 21 can, however, also be of a different diameter to that of the ball shaft. The cam shaft 4 further includes a protrusion 22 extending from one side 21*a* of the body and a recess or socket, or blind bore, 23 formed in the other side 21*b* of the body 21. The protrusion 22 is shaped to be received in a correspondingly shaped recess or socket 24 formed in the ball shaft. The recess or socket 23 of the cam shaft 4 is shaped to receive a correspondingly shaped bushing 14.

The bushing 14, in turn, is provided with a bore 8 therethrough, to receive the motor shaft 2. The bushing needs to receive the motor shaft in such a manner that rotation of the motor shaft causes corresponding rotation of the bushing 14 without slippage. This could be achieved by engaging surface features or shapes in the bore and on the motor shaft e.g. splines, ribs or the like. Alternatively, as in the example shown, the bushing is provided with a radial bore 9, the motor shaft 2 is provided with a corresponding bore 19 therethrough that aligns with the bore 9 when the motor shaft 2 is correctly located in the bushing 14, and a pin 3 is provided that is inserted through both bores 9, 19 to secure the motor shaft and bushing to rotate together. The pin 3 is preferably a shear pin 3 made of a material designed to transfer maximum torque before exceeding its shear strength. In the event that excessive torque is applied by the motor, the shear pin would be the first to break. This will be discussed further below.

The bushing is also important in that it enables the cam shaft to be rotatably secured to the motor shaft without the need for any holes through the walls of the cam shaft. This is advantageous because holes in the cam shaft can have an adverse effect on any microswitches on the cam shaft.

To ensure effective torque transfer, the sockets and protrusions should have non-circular cross-sections. One design that the inventors have found to be advantageous in this respect is a shape forming multiple lobes separated by valleys. The examples show four lobes 22a for the bushing as this has been found to be optimal in terms of torque transfer and strength whilst maintaining simplicity and ease and cost of manufacture. For the cam shaft protrusion 22, the examples show five lobes 222a, which again, has been found to be optimal, but advantages can be obtained with two or more lobes. Other shapes are also possible. A non-circular shape avoids slip between the components on rotation even in the event that there is some resistance to rotation at one of the parts of the assembly.

In more detail, in the examples as best shown in FIGS. 3A, 3B, 4A and 4B, the bushing 14 (which is preferably a metal part), is formed to define a central ring defining the bore 8 and from which the lobes extend radially. The preferred form of lobes are in the form of partial solid round bars 7 separated around the ring by valleys. The cam shaft has a blind bore formed with an inner profile matching that of the outer surface of the lobes of the bushing.

Similarly, at the interface of the cam shaft and the ball shaft, the camshaft head is formed as several partial solid round bars (here five) and the recess in the ball shaft has a corresponding profile to match and receive the outer surface of the cam shaft head lobes.

The dielectric cam shaft between the drive shaft and the ball shaft provides the necessary torque transmission and also forms a dielectric barrier between the metal motor shaft and ball shaft as these are nowhere in direct electrically conductive contact with each other. Furthermore, the tight-fitting, shaped engagement between the cam shaft and the other rotating components ensures torque transfer through the assembly.

Various dielectric materials can be used for the cam shaft and can be selected depending on the required properties for the application e.g. dielectric properties, robustness, light-weight, cost, workability, corrosion resistance, thermal properties, long life. Some examples include PEEK, glass-reinforced plastic (GRP), materials such as G10/FR4 or G11/FR5, Plasma electrolytic oxidation (PEO)-aluminium, ceramics etc. Zirconia, yttrium oxide (Y2O3), rubber, etc. Ideally, the material selected should have superior strength in terms of compression rather than in the tension or shear directions, as the torque is transferred in the compression direction. Plastic and rubber materials allow the cam shaft to buffer vibration or shocks sent by the motor through the system.

The cam shaft can be quickly and easily fitted and does not require precise alignment, since it will naturally slot into the right position even if initially located slightly out of alignment. It is therefore impossible to assemble the parts of the assembly incorrectly. The tight fitting between the parts reduces the effect of any backlash and ensures reliable torque transfer. The shape is also such that coaxiality between the parts is ensured.

By forming the cam shaft of dielectric material, a part of the assembly that is already present for torque transmission is also used as a dielectric barrier and so no additional barrier parts are required. Fewer parts also reduces the backlash effect. The use of engineering plastics for the cam shaft can also overcome problems of friction which can affect the microswitches with a steel cam shaft.

The dielectric barrier and compliant joint drive have been described above in the context of a ball shaft valve assembly. This is only an example of where the dielectric barrier can provide advantages and can find application. The dielectric barrier assembly of this disclosure can, however, find application in other assemblies where torque is transmitted between a drive end and a driven end.

The terms "about" and "substantially" are intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A torque transfer assembly comprising:
    a drive shaft;
    a driven shaft;
    wherein the drive shaft comprises:
        a motor shaft configured to be connected to and rotated by a motor; and
        a cam shaft connected to and rotatable with the motor shaft;
        wherein the driven shaft is connected to and rotatable with the cam shaft; and
        wherein the cam shaft is formed of a dielectric material defining an insulating barrier between the drive and the driven shaft; and
    a bushing connected to the cam shaft and via which the cam shaft is connected to the motor shaft;
    wherein the cam shaft is provided with a protrusion from a first side to engage in a matching recess in the driven shaft, and a recess on an opposite, second side to receive the bushing in form fitting engagement;

wherein the bushing is provided with a bore extending axially therethrough to receive the motor shaft in such a manner as to ensure rotation of the bushing with rotation of the motor shaft;

wherein the bushing also includes a bore extending radially through the bushing, the motor shaft having a corresponding bore therethrough, such that when the bore through the bushing and the bore through the motor shaft are aligned, a shear pin bore is formed to receive a shear pin therethrough.

2. A torque transfer assembly as claimed in claim 1, further comprising:

the shear pin.

3. A torque transfer assembly as claimed in claim 1, wherein the protrusion of the cam shaft and the recess of the driven shaft, and the recess of the cam shaft and the bushing each have multiple points of contact.

4. A torque transfer assembly as claimed in claim 3, wherein the protrusion of the cam shaft is formed of a number of lobes separated by valleys.

5. A torque transfer assembly as claimed in claim 4, wherein the protrusion of the cam shaft comprises five lobes.

6. A torque transfer assembly as claimed in claim 3, wherein the bushing is formed of a number of lobes separated by valleys.

7. A torque transfer assembly as claimed in claim 6, wherein the bushing comprises four lobes.

8. A torque transfer assembly as claimed in claim 1, wherein the drive shaft and the driven drive shaft are formed of steel.

9. A torque transfer assembly as claimed in claim 1, wherein the bushing is made of steel.

* * * * *